UNITED STATES PATENT OFFICE.

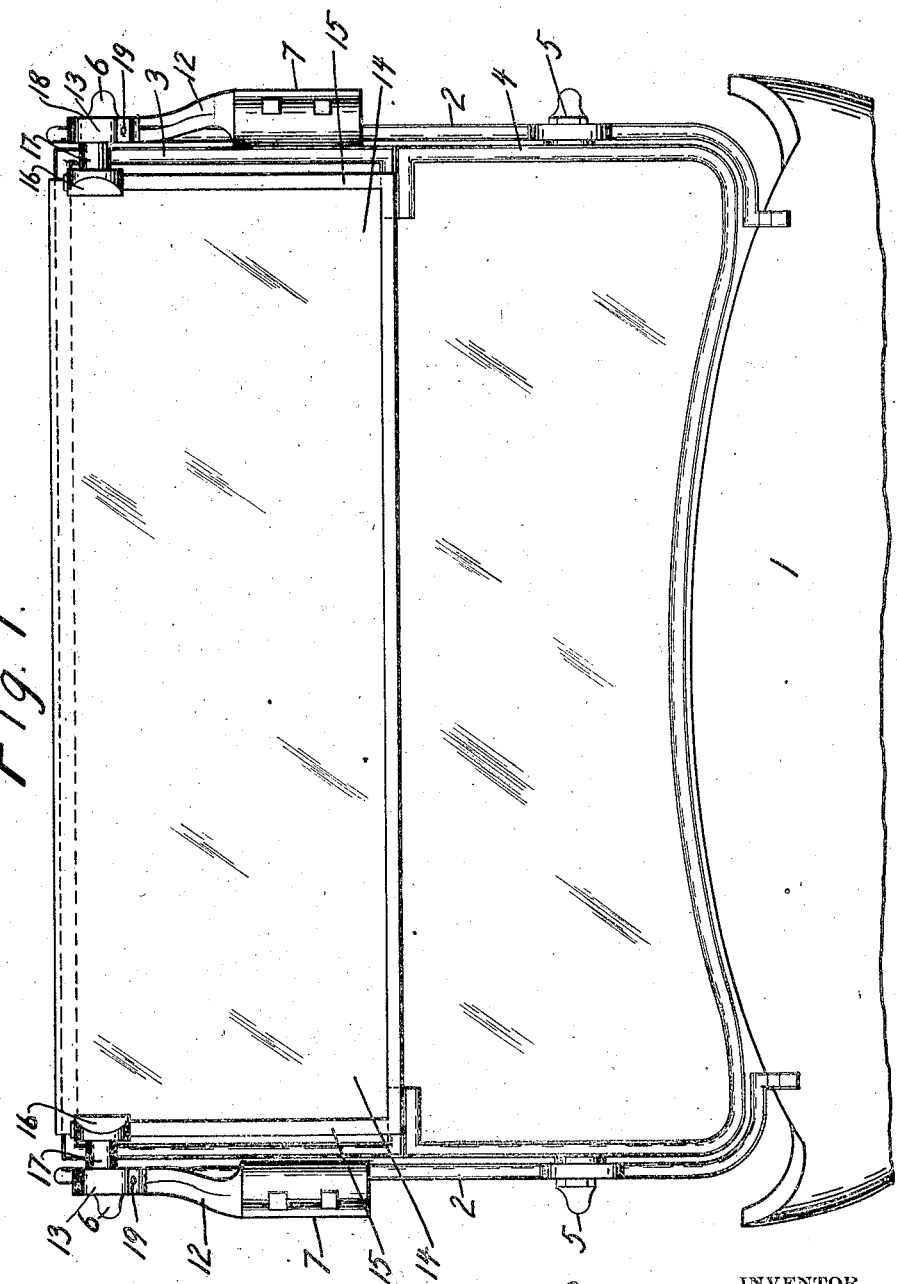

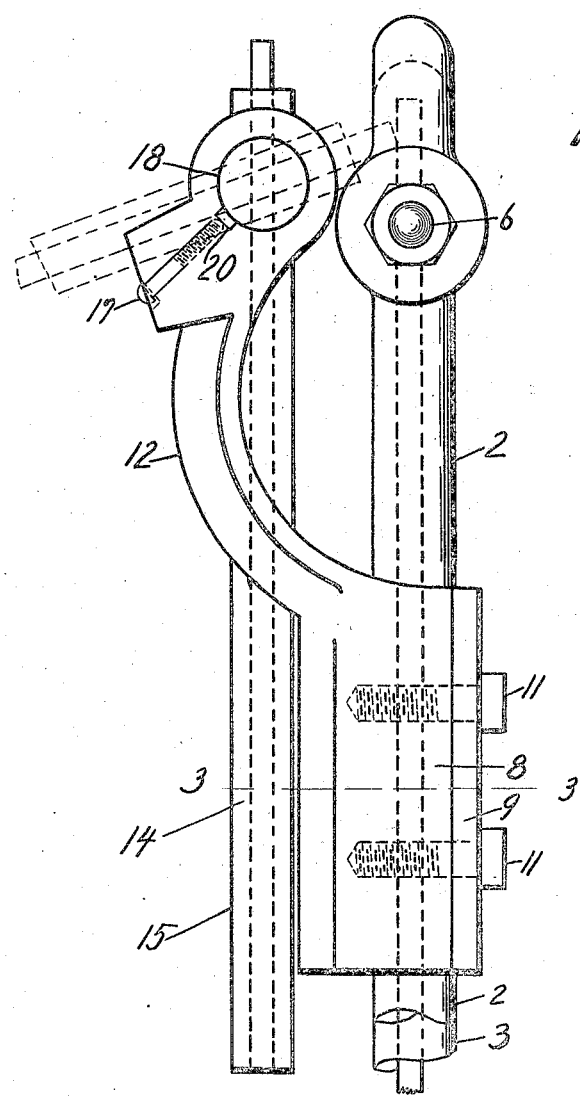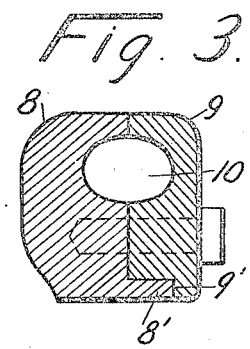

GEORGE A. HOLSBERG, OF SAN FRANCISCO, CALIFORNIA.

WINDSHIELD SUNSHADE.

1,421,942.  Specification of Letters Patent.  Patented July 4, 1922.

Application filed November 18, 1919. Serial No. 338,843.

*To all whom it may concern:*

Be it known that I, GEORGE A. HOLSBERG, a citizen of the United States, residing at the city and county of San Francisco and State of California, have invented certain new and useful Improvements in Windshield Sunshades, of which the following is a specification.

Motor vehicles as at present used are equipped in a majority of cases with windshields or guards of the glass type, which consist of upper and lower sections, one or both of which are capable of pivoted movement in a horizontal plane, and in wet or rainy weather the present practice is to pivot one of the sections to enable a clearer vision to be had of the road ahead, as during the rain the same accumulates on the outer surface of the shield in front of the driver and seriously interfere with the view of the road ahead. Devices have been provided for removing the moisture accumulated on the outer surface of the shield sections to enable the operator to have a clearer view through the shield, and in certain closed types of automobiles double shields have been provided at the upper portion of the wind-shield, one of these shields being capable of outward swinging movement to protect the other shield in case of rain and preclude the wetting thereof or the accumulation thereon of the rain drops during such rain.

The present invention relates to a detachable auxiliary rain or weather shield, adapted for attachment to the shields of open cars and which is capable of operation or swinging movement outwardly at an angle to lie in advance of the top shield section to protect the same from the rain and enable the operator to have a clear view of the road through said top section during rainy weather.

The present invention has for its principal objects to provide a construction which is adapted for association with shields now already on the market, and whereby when attached a supplemental or protecting rain shield is provided which is capable of swinging movement to provide an outstanding protecting member which will preclude the wetting of a portion of the regular shield through which the driver views the road enabling the driver to have a clearer vision of the road during rainy weather.

With the above mentioned and other objects in view, the invention consists in the novel construction and combination of parts hereinafter described illustrated in the accompanying drawings, and set forth in the claim hereto appended, it being understood that various changes in the form, proportion, size and minor details of constuction within the scope of the claim may be resorted to without departing from the spirit or sacrificing any of the advantages of the invention.

To more fully comprehend the invention reference is directed to the accompanying drawings, wherein, Fig. 1 is a view in plan of the preferred embodiment of my invention in position on one type of automobile wind-shield.

Fig. 2 is a view in side elevation.

Fig. 3 is a sectional view taken on line 3—3 of Figure 2.

In the drawings the numeral 1 indicates the hood of an automobile upwardly from which extend the shield mounting standards 2, and between which standards are mounted transparent upper and lower shield sections 3 and 4, the lower edge of each of which is capable of swinging movement inwardly and outwardly, due to the provision of the fulcrum points 5 for the lower shield section and the fulcrum point 6 for the upper shield section.

My improved auxiliary shield is preferably secured to the standards 2 by brackets 7, one of which is detachably secured to the upper end of each standard 2. The brackets 7 consist of the cooperating base portions 8 and 9 which are provided with vertical cooperating grooves 10 adapted to receive the standards 2 when the brackets are mounted thereon, and when the respective sections 8 and 9 of the respective brackets 7 are drawn together by suitable clamping screws 11.

To secure alignment of the respective sections 8 and 9, the section 8 is provided with a flange 8', which when the sections are assembled is received in a depression 9'. The flange and depression are preferably located on their respective parts adjacent the outer longitudinal side edge and preferably extend the full length of their respective parts.

Extending from the base 8 of each bracket is an arm 12, carrying a head 13 which is disposed approximately at the upper end of the standards 2 or adjacent the fulcrum point 6 of the top shield section 3, and the inner side of said head is adapted to lie in a plane substantially parallel with the inner side wall of the respective standards 2.

Positioned in advance of the upper shield section 3 is the auxiliary protecting or rain shield 14 preferably of transparent material and preferably of a size to completely overlie the shield section 3, although said shield section 14 may, if desirable, overlie both sections 3 and 4, or it may be even smaller than the section 3. However, it is preferable to have a shield section 14 of a width coextensive with the shield section 3 and of a length approximately equal thereto.

The shield section 14 is illustrated as being mounted in a light channel frame 15, extending over the side and lower edges thereof, and said frame is secured adjacent its upper ends to suitable grooved pinion members 16 from which extend the lateral fulcrum members 17, passing through and fulcruming in bores 18 in the head 13. The fulcrum members 17 are adapted to be locked from axial rotation within the bores 18 by the adjustment of suitable set screws 17 having threaded connection with the heads 13 and cooperating at their inner ends with compression shoes or members 20, one of which cooperates with each fulcrum 17.

It will be apparent that by providing the auxiliary shield in front of the main shield and fulcruming said auxiliary shield adjacent its upper edge, that the lower edge thereof may be swung outwardly as in dotted lines, Fig. 2, and thus provide an outstanding portion which will overlie the wind-shield proper and prevent the rain from directly striking the same, enabling the operator to have a clear vision of the road ahead.

In the present embodiment of the invention, it will be apparent that the auxiliary shield 14 fulcrums adjacent the fulcrum point 6 of the upper section 3 of the main shield and which permits, when this auxiliary shield is in place of the outward swinging of both shields if desirable, thus, it is not necessary to remove the auxiliary shield 14 when it is desired to outwardly swing the upper section 3 of the main shield, as both the section 3 and the auxiliary shield 14 may be swung outwardly at the same time.

While I have illustrated the protecting shield as being mounted in a particular manner, I desire it to be understood that the invention which I wish to protect is the positioning of an auxiliary or protecting shield in advance of the main shield of a motor vehicle and to so mount said auxiliary or protecting shield that the same may be extended or positioned to project outwardly over the main shield to preclude the rain from striking preferably on the upper section of the main shield thereby providing a clear portion of the main shield through which the vehicle operator may view the road ahead.

The wind-shield as now commonly in use with my improvement attached thereto, comprises an auxiliary shield member associated preferably with the upper shield section detachably secured in position with one of the sections capable of pivotal movement to overhang the other to prevent the rain from striking the rear shield section and thus enabling the driver or operator to have a clear view of the road ahead, and at the same time to be protected from rain and wind by the shield section through which the view of the road is had.

Having thus described my invention what I claim as new is:

The combination with a windshield having upper and lower panels, of a frame for said panels, a hinged joint connection between the upper end of the top panel and the frame to permit a swinging movement of said panel in said frame whereby it may occupy different positions of adjustment, a pair of brackets detachably connected to said frame below the hinged connections between the same and the upper panel, vertically disposed arms extending from said brackets and positioned so as to be out of the horizontal path of movement of the swinging upper panel, bearings in said arms and disposed in substantially the same horizontal line as said hinged joints for the upper panel, and a swingnig auxiliary shield overlying a portion of the upper panel supported in said bearings in said arm.

In testimony whereof I have signed my name to this specification in the presence of a subscribing witness.

GEORGE A. HOLSBERG.

Witness:
D. B. RICHARDS.